Patented Sept. 28, 1937

2,094,554

UNITED STATES PATENT OFFICE 2,094,554

MANUFACTURE OF MOTOR FUELS

Le Roy G. Story, Bronxville, N. Y., assignor to The Texas Company, New York, N. Y., a corporation of Delaware No Drawing. Application November 8, 1934, Serial No. 752,121

3 Claims. (Cl. 44—9)

This invention relates to motor fuels and has to do particularly with the manufacture of volatile liquid motor fuels, such as gasoline and kerosene, which are relatively stable as to color and anti-knock properties, and have little tendency to form gum, said fuels containing natural or self-generated inhibitors which substantially stabilize the fuel against deterioration.

It is known that cracked hydrocarbon distillates, particularly certain cracked gasolines, contain natural occurring bodies which have a preservative effect on the oil whereby the distillate is relatively stable against oxidation and like reactions which tend to form gum, color bodies and cause depreciation in anti-knock properties. While it is not known definitely just what the composition of all these inhibitors may be, some of the materials have been isolated and shown definitely to have positive preservative qualities for the oil from which they were derived. These materials comprise certain nitrogen compounds, presumably amines or alkaloids, but the chief constituents are usually complex phenolic materials or derivatives of phenols.

An object of the present invention is to manufacture a petroleum distillate having sufficient natural inhibitor bodies developed therein to protect the distillate from deterioration on storage.

Another object of the invention is to provide means for increasing the amount of natural inhibitors normally occurring in the distillate.

A further object of the invention is to form in situ a controlled amount of inhibitors in a cracked distillate during the manufacture of the same.

In accordance with the invention the foregoing objects may be accomplished by providing in the oil at suitable stages during manufacture materials which may be changed or converted in the presence of such oil and under the influence of the manufacturing operations into effective stabilizing agents. It is accordingly contemplated that potential inhibitor forming substances may be added to the oil and these substances may be converted into actual inhibitors under the influence of the manufacturing conditions. It is also contemplated that I may add substances which are inherently of such character that they have inhibition tendencies but may be substantially ineffectual in their present state. Such materials are added to the oil during the manufacturing operation whereby such substances undergo reactions in the presence of the constituents of the oil to which they are added whereby they are transformed into efficient inhibitors.

The place and time of introduction of the inhibitor into the oil to be treated may vary considerably and depend upon the character of the substance employed and the nature of the manufacturing operation. If the materials added must be cracked, rearranged or converted into new materials, which are of substantially different character and composition than the parent materials, drastic treating conditions are advantageous, such as those encountered in the cracking or reforming of hydrocarbon oils. The materials, in such case, are preferably injected into the heating, digestion or evaporation stages of a commercial cracking or reforming system. Again, if the materials used require reactions such as polymerization, substitution or a mild rearrangement, milder conditions may be desirable, such as those encountered in the purifying, fractionating or refining steps applied to the cracked products or distillates. In the latter instance, the materials may conveniently be added to the product to be refined or combined with the treating reagent whereby it is subjected to the conditions of such refining treatments while in the presence of the hydrocarbon oil.

Manufacturing operations in combination with which the present invention may be used include any ordinary or preferred cracking process in which heavy oils are converted into low boiling products, such as gasoline; reforming operations in which naphtha is transformed into a product of higher anti-knock value; treatments with adsorptive catalysts, such as fuller's earth; treating and refining processes involving chemical polymerization, such as those using aluminum chloride, zinc chloride or other metallic halides; digestion processes for the pressure polymerization of the more reactive unsaturated constituents; and, high temperature and pressure hydrogenation operations. In processes involving cracking, hydrogenation or reforming of hydrocarbon oils, the inhibitor forming substances may be introduced into the charging or recycle stock to be passed through the system and subjected to the same operations and conditions of temperature and pressure, as the charging stock, although it may sometimes be more advantageous to introduce them into one or more digestion, evaporation or fractionating zones.

In cases where the distillate is subjected to a subsequent refining operation, for example, rerunning or redistillation with or without digestion to remove natural high boiling or polymerized products, such treatment may be conducted while the oil is in the presence of an inhibitor-forming body. In the liquid or vapor phase refining of cracked distillates with catalysts, such as fuller's earth or other catalytic adsorptive materials, I may add an inhibitor forming substance to the oil or the catalysts in such operations. Also cracked distillates are often subjected to refining operations with zinc chloride, anhydrous aluminum chloride, sulfuric acid, and similar polymerizing catalysts and the inhibitor forming substances may be conveniently added to the oil and the mixture subjected to the action of such chemical catalysts.

One class of inhibitor forming substances which I may use are materials which, on destructive distillation or cracking, yield substantial amounts of materials that are known to be effective anti-oxidants or gum inhibitors for cracked oils. Such materials include coal tar, or coal tar products resulting from the low or high temperature carbonization of coal, peat or other bituminous materials; or fractions of coal tar, including the middle oil or carbolic oil, the heavy or creosote oil, the anthracene oil or more closely fractionated cuts of coal tar. Other materials which are useful are tar acid oil from the destructive distillation of hard wood, bone tar and tar distillates from the distillation of certain resins and gums. Shale oils or tars obtained from the destructive distillation of certain oil-producing shales have also been found to be useful.

Another class of materials which I may use are substances of the character of, or belong to, the class of compounds known to be effective inhibitors but either are of no substantial value, or for some other reason, such as undesirable solubility characteristics, are not in themselves useful. Some of the latter materials may often be used according to my invention because of their cheapness or the high degree of effectiveness of the products into which they are transformed by my process. These materials include phenols, cresylic acids, tar acid oils from coal or wood, polyhydric phenols, aromatic mono- and polyy-amines.

The first class of materials described above are those I prefer to introduce into the charging stock, the digestion or evaporation chambers, or into the recycle stock of a commercial cracking system. The materials are thereby subjected to drastic conditions of temperature and pressure which cause cracking and transformation of the heavier materials into lighter and more desirable substances for use as inhibitors. The conversion of the materials in the presence of the cracked hydrocarbons, or hydrocarbons undergoing cracking, has a beneficial or modifying effect thereon, in that the cracked hydrocarbons tend to react with the substances so introduced to produce increased amounts of derivatives of the same which are peculiarly effective for preserving the oil.

The materials of the second class disclosed above are chiefly those more pure or less complex bodies, which it is not necessary, and often undesirable, to subject to such drastic conditions as those of the first class; and, while I may introduce certain of the more stable substances of this class, such as phenol, cresylic acid, etc., into the charging stock of a cracking or reforming system, I prefer to subject many of them to less severe conditions of temperature and pressure. Accordingly, I may introduce them into the fractionating or dephlegmating zones of such systems; but, I prefer to combine them with the cracked distillate and the distillate subjected to one or more finishing treatments, including digestion under mild conditions of temperature and pressure, treatment in the vapor or liquid phase with adsorptive catalysts, and chemical refining with aluminum chloride, zinc chloride or sulfuric acid. In such reactions it has been found that derivatives are formed which are very effective for preserving the oil.

In practicing the invention in connection with a commercial cracking process, I prefer to use crude coal tar or tar acid oil, the latter consisting of that fraction distilled between the light oil and pitch and usually boiling between about 180° and 270° C., although a crude tar from the distillation of beech wood or a crude tar obtained from the distillation of oil shales, may be used. The materials are added in the ratio of about ¼ to 1½ barrels to 1,000 barrels of charging stock. The amount may be regulated to obtain a final distillate of the correct degree of stability, which may be easily controlled by measuring the copper dish gum or the induction period. By adding about one barrel of coal tar per 1,000 barrels of charging stock to a cracking still operating on a Mid-Continent gas oil, a cracked gasoline of less than 10 mg. of gum by the copper dish or an induction period in excess of 4 hours, should be obtained.

In connection with a reforming operation, I may add the same materials as specified for a commercial cracking operation, but I prefer to add a lighter color, more refined product, such as cresylic acid, phenol or one or more fractions of coal tar, beech wood tar or shale oil tar. In using cresylic acid, about the same amounts as given above, or somewhat less,—say $\frac{1}{10}$ to ¾ of a barrel per 1,000 barrels of naphtha, ordinarily give good results. By using about ¼ of a barrel to 1,000 barrels of naphtha charge, a satisfactory induction period on the refined oil is ordinarily obtained.

When using the second class of materials outlined above, I prefer to add these substances to the final distillate prior to subjecting the same to a finishing treatment. However, they may be added satisfactorily in many cases to the fractionator or dephlegmator of a cracking still, for example, by adding it to the reflux condensate. Phenols, such as polyhydric phenols, naphthols, aromatic amines and in some cases, aminophenols, are suitable for adding to the final distillate which is to be given a finishing treatment at elevated temperatures with fuller's earth or at lower temperatures when treated with sulfuric acid or zinc chloride. The treated distillates are then substantially finished products and of good stability. The amounts of phenolic material to be added to the distillate is about $\frac{1}{10}$ to ¾ barrel per 1,000 barrels of the distillate. Usually an amount to give the equivalent of about .005 to .01% inhibitor in the finished product is ordinarily employed.

In practicing the invention in connection with clay treating processes, if the treatment is in the vapor phase, that is, vapor of the oil passed through the clay, it is preferable to use a stable relatively low boiling material, such as phenol, cresylic acid, creosote oil, etc., which may conveniently be added to the gasoline and vaporized therewith. However, in some cases, the material, if a solid, such as pyrogallol, may be mixed to advantage with the clay. The invention is applicable to the liquid treatment with clay in which the oil is contacted in the liquid phase with the solid adsorbent material. In this way, the materials may be added to the oil or to the clay and good contact obtained between the substance and the oil even if the material is a solid and relatively insoluble, because sufficient material is maintained in solution at all times to obtain the desired result. Clay treated products are often particularly unstable with respect to gum formation but by my process products of satisfactory stability may be obtained.

In refining operations, such as treatments with zinc chloride or sulfuric acid or other polymerizing agents, the substance is added to the oil in solution or in suspension and the mixture contacted with the treating agent. These operations are particularly suitable for using polyhydric phenols, aromatic amines, aminophenols, etc., which are more suitable for low temperature operations. By such treatments the solubility of substances which are relatively insoluble may be materially increased and also the efficiency of relatively good inhibitors, as well as those of low activity, such as the simpler phenols and amines, be greatly improved.

The reactions involved in the operations, according to the invention, are not fully understood and therefore I do not wish to be limited to any theory. With the exception of those instances in which the inhibitor material is added to the final distillate and the mixture subjected to a refining treatment, the reactions involved are believed to be those of degradation of the molecule and production of lower boiling phenolic bodies, particularly from the heavier coal tar products. An important reaction which is believed to occur is the combination of unsaturated constituents of the cracked oil with the inhibitor bodies to produce substituted alkyl derivatives, ethers, etc. These derivatives are generally more effective and have higher solubility in the oil than in water. The derivatives are also generally more effective than the parent material. For instance, in the case of the phenolic bodies, such as cresylic acids and phenols, the effectiveness per unit volume is materially increased by the treatment. Thus, assuming that cresylic acid is used, this material may ordinarily contain a small percentage of phenolic bodies that have inhibiting properties, yet by subjecting it to the treatment of the present invention, it may be converted to a high percentage of very active compounds, as shown by the high stability of the finished distillate and considering the small amount of inhibitor that is ultimately present in the product.

It is sometimes customary to give hydrocarbon distillates finishing treatments by washing with caustic alkali solutions, or with an alkaline plumbite reagent to remove objectionable sulfur compounds. In such treatments, a substantial amount of the developed inhibitors may be removed. The alkaline reagent may be treated to recover these inhibitors by neutralization with acids or carbon dioxide containing gases, such as flue gas, whereby the inhibitors are liberated and may be separated and returned to the distillate with or without purification, such as fractional distillation. The removal of the natural inhibitors may, however, be avoided by treating with less alkaline or non-alkaline reagents, such as cuprous chloride, magnesium oxide, hypochlorite, etc., whereby sulfur compounds may be removed or converted into less objectionable forms without removal of the natural inhibitors.

Obviously many modifications and variations of the invention, as hereinbefore set forth, may be made without departing from the spirit and scope thereof, and therefore only such limitations should be imposed as are indicated in the appended claims.

I claim:

1. A process for the manufacture of stable cracked hydrocarbon distillates from hydrocarbon oils which normally produce cracked distillates deficient in natural inhibitors and tend to deteriorate and form gum on storage, which comprises adding to said hydrocarbon oils an aromatic tar from the destructive distillation of coal and wood which are substantially ineffectual as gum inhibitors, then subjecting the resulting mixture to conversion temperatures whereby a cracked distillate is formed and said potential inhibitor-forming bodies are converted into active inhibitors, and regulating the addition of the potential inhibitor-forming bodies to form in situ active inhibitors in sufficient amount to produce a cracked distillate substantially stable against deterioration and gum formation.

2. The method according to claim 1 in which said aromatic tar is added in the ratio of about ¼ to 1½ barrels of tar to 1000 barrels of hydrocarbon oil subjected to conversion.

3. In the manufacture of cracked hydrocarbon distillates, wherein a hydrocarbon oil is subjected to conversion conditions within the range of cracking temperatures, to produce cracked distillates of the class of gasoline and kerosene which are deficient in natural inhibitor bodies and normally unstable and tend to form gum on storage, the improvement which comprises adding to the oil, prior to subjecting the same to the conversion operation, a predetermined amount of an inhibitor-forming material of the class of tars from the destructive distillation of coal and wood and which produces active inhibitor bodies during said conversion operation, whereby a cracked distillate is formed containing self-generated inhibitors in larger amount than normally is produced in said distillate without the addition of said inhibitor-forming material and sufficient to stabilize the distillate against deterioration and gum formation.

LE ROY G. STORY.